Sept. 30, 1947.  L. G. SAYWELL  2,428,041
SEALING ASSEMBLY
Filed Sept. 26, 1945  3 Sheets-Sheet 1
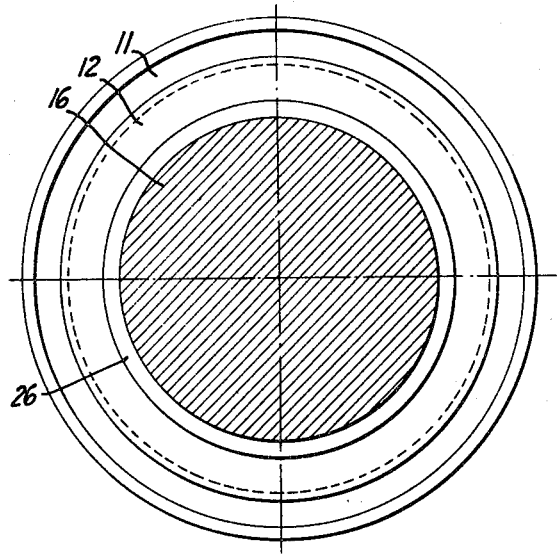
FIG.2
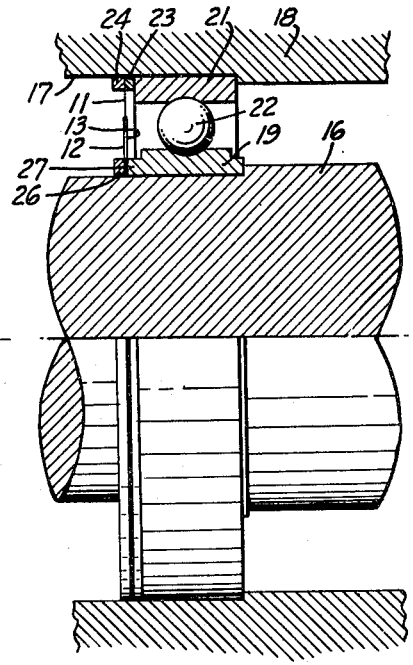
FIG.1
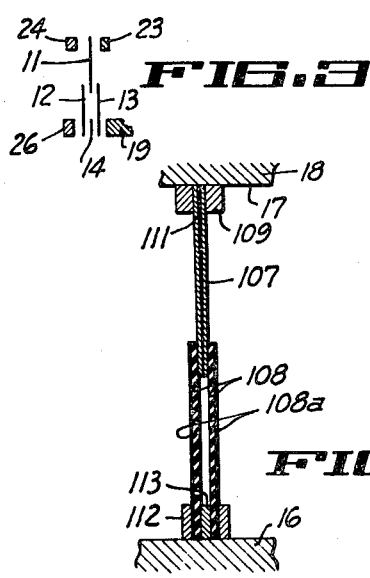
FIG.3
FIG.15A
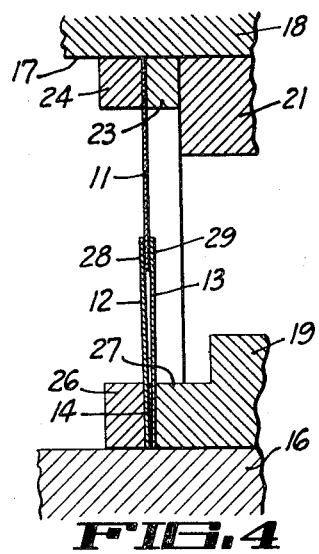
FIG.4
INVENTOR.
Lawrence G. Saywell
BY
ATTORNEY Sept. 30, 1947.   L. G. SAYWELL   2,428,041
SEALING ASSEMBLY
Filed Sept. 26, 1945   3 Sheets-Sheet 2

INVENTOR.
Lawrence G. Saywell
BY Paul D. Flehr
ATTORNEY

Sept. 30, 1947.  L. G. SAYWELL  2,428,041
SEALING ASSEMBLY
Filed Sept. 26, 1945  3 Sheets-Sheet 3

INVENTOR.
Lawrence G. Saywell
BY Paul D. Flehr
ATTORNEY

Patented Sept. 30, 1947

2,428,041

UNITED STATES PATENT OFFICE 2,428,041

SEALING ASSEMBLY

Lawrence G. Saywell, San Mateo, Calif., assignor to Saywell Associates, South San Francisco, Calif.

Application September 26, 1945, Serial No. 618,729

8 Claims. (Cl. 286—11)

This invention relates generally to assemblies suitable for use with relatively rotatable parts to provide a fluid-tight seal.

In the past shaft or bearing seals have been used to seal against loss of lubricating oil or grease, or to prevent passage of gases or other fluids. Typical prior assemblies have employed cup leathers or similarly shaped elements formed of leather, synthetic rubber or like material, having an annular surface urged by metal springs into sealing engagement with the shaft. Such assemblies are subject to certain inherent disadvantages. For example considerable friction is encountered between the parts in rubbing contact and such friction is particularly noticeable when relatively high speeds of rotation are encountered. It is not uncommon for the cup leathers to deteriorate in operation, with the result that considerable servicing is required to replace worn cup leathers or cup leathers which have otherwise lost their ability to maintain a prior seal. Even when the cup leathers are in good condition the seal is not always as perfect as desired, and leakage is frequently encountered due to inherent pumping action, particularly at the higher speeds. Leakage also develops in the event of slight misalignment of the shaft with respect to the bore or bearing in which it is operating. A typical assembly of this character requires considerable space for its installation thus placing limitations upon the design of equipment with which the seals are to be used. The first cost of such seals is also considerable, and installation is frequently troublesome and expensive.

It is the general object of the present invention to provide a sealing assembly which will overcome the inherent defects of prior art seals as outlined above.

A further object of the invention is to provide a sealing assembly which is capable of use at high rotational speeds without being subject to pumping action with resulting leakage.

Further objects of the invention are to provide a sealing assembly which will be subject to little if any wear even after long periods of usage, which will require a minimum amount of servicing, which will occupy a relatively small space and thereby better lend itself to installation with various types of equipment, which can be manufactured at relatively low cost, and which can be readily incorporated with a given shaft assembly.

Further objects of the invention will appear from the following description in which the preferred embodiments have been set forth in detail in conjunction with the accompanying drawing.

Referring to the drawing:

Figure 1 is a side elevational view, partly in section, illustrating one embodiment of my invention.

Figure 2 is an end view of the assembly shown in Figure 1.

Figure 3 is an exploded view diagrammatically illustrating the construction of the sealing assembly shown in Figure 1.

Figure 4 is an enlarged sectional view showing more clearly that form of the invention incorporated in Figure 1.

Figure 15a is an enlarged cross-sectional detail illustrating another form of the invention in which non-metallic material is used to provide certain sealing areas.

Figure 5:
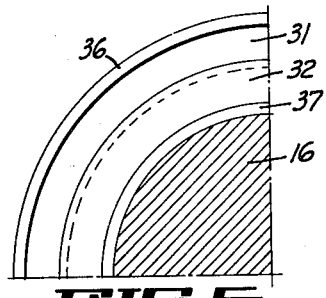
Figure 5 is a quarter end view of another form of the invention.

In general my invention utilizes a simple assembly of parts capable of establishing reliable and effective interface sealing contacts on annular areas concentric with the axis of the shaft with which the assembly is used. The interface contacts are such that although an effective seal is formed irrespective of the relative speeds of rotation, a minimum of friction is provided, and the contacting areas are not subject to appreciable wear. Preferably the principal parts are assembled in such a manner that the areas in sealing contact are preloaded with respect to the forces urging the same together, and whereby it is unnecessary to provide special ground surfaces on the shaft or other parts with which the assembly is used.

Referring particularly to that form of the invention illustrated in Figures 1 to 3 inclusive, I have provided a sealing assembly including annuluses 11, 12 and 13 which are formed of relatively thin flexible sheet metal. The annuluses in this instance are flat or planar, and can be formed of suitable spring metal or metal alloys such as high carbon steel, phosphor bronze, or one or more of the so-called stainless steels. Referring particularly to exploded Figure 3 the larger annulus 11 is dimensioned to have an inner peripheral marginal edge adapted to overlap outer marginal edge portions of the smaller annuluses 12 and 13. Interposed between the inner margins of annuluses 12 and 13, there is a spacer ring 14 which can be conveniently formed of thin sheet metal of a gauge slightly less than the gauge of annulus 11. For example assuming that the sheet metal forming annuluses 11, 12 and 13 measures .003 inch in thickness, spacer 14 can be of the order of .002 inch in thickness.

Prior to applying the above parts to a shaft or bearing, it is desirable to assemble them substantially as indicated in Figures 1 and 4, and to retain annuluses 12 and 13 and spacer 14 in assembled relationship upon annulus 11, as by spot welding through the spacer 14, say at four circumferentially spaced points.

As illustrated in Figures 1, 2 and 4 the sealing assembly is applied to a conventional shaft 16 extending through the bore 17 in the outer part 18. This outer part may be a bearing housing, or in the event the shaft 16 is stationary, it may be the hub of a rotating part. A conventional ball bearing assembly is shown between shaft 16 and housing 18, consisting in this instance of the inner and outer ball races 19 and 21, and the balls 22. The assembly formed by the annuluses 11, 12 and 13 is shown positioned in a plane adjacent to the ball bearing assembly and at right angles to the axis of shaft 16. A shoulder or spacer ring 23 is interposed between annulus 11 and the adjacent ball bearing race 21. A clamping ring 24 retains the outer peripheral edge of annulus 11 in sealing engagement with ring 23, and may have a forced fit within the bore 17, or otherwise retained in proper clamping position. Similarly the inner peripheral edges of annuluses 12 and 13 are clamped together upon spacer 14, by clamping ring 26, which urges the assembly toward the annular shoulder 27 formed on the inner ball bearing race 19.

Enlarged Figure 4 is exaggerated with respect to the thickness of the annuluses 11, 12 and 13 but serves to illustrate the manner in which these parts cooperate to provide an effective fluid seal. Two spaced and substantially parallel interface contact areas 28 and 29 are provided, which are likewise generally at right angles to the axis of the shaft 16. The annular areas in contact are yieldably urged together by virtue of the stressing of the annuluses 12 and 13 in a direction longitudinally of the shaft, by virtue of the fact that spacer 14 is slightly less in thickness than the annulus 11. It will be evident that this stressing is well within the elastic limit of the material. A thin film of lubricating oil between the areas in contact serves to reduce rubbing friction to a minimum, while at the same time because such oil films are of capillary or microscopic dimensions, a seal is established which is capable of withstanding considerable fluid pressure. Considering that the shaft 14 rotates relative to the outer housing, and that liquid or semi-liquid lubricant is present on the right hand side of the assembly as shown in Figure 4, there can be no pumping action tending to cause flow of lubricant through the areas in interface sealing contact. This is because the interface contacting areas 29 extend inwardly toward the axis of the rotating shaft, from that edge of the same which is exposed to the bearing space. However although pumping action is not present even at relatively high speeds, capillarity is sufficient to insure continued presence of an adequate lubricating film at all times. Assuming annuluses of resilient spring metal having a thickness of the order previously mentioned, namely about 0.003 inch, the extent of overlap may be of the order of from say $\frac{1}{16}$th to $\frac{1}{8}$th of an inch for the more common sizes of bearings and shafts.

Figure 6:
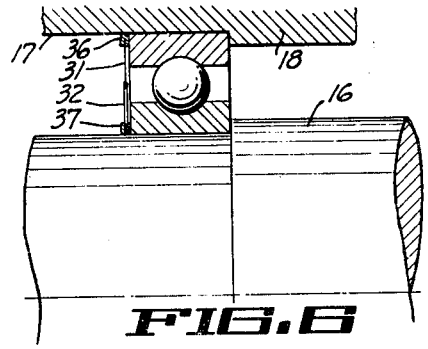
Figure 6 is a side elevational view in section, showing the same form of the invention illustrated in Figure 5.
Figure 7:
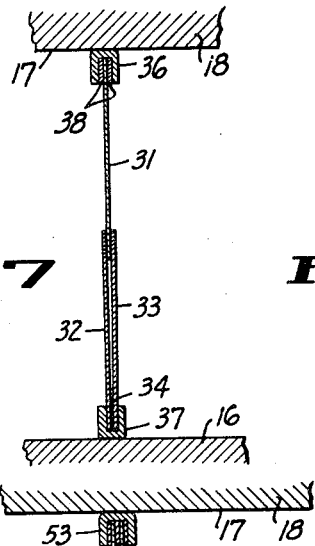
Figure 7 is an enlarged sectional detail of that form of the invention illustrated in Figures 5 and 6.

That form of the invention illustrated in Figures 5 to 7 inclusive is similar to the form described with reference to Figures 1 to 4 inclusive, but the sealing assembly is provided with special mounting rings to facilitate its application to a shaft. Thus in this instance the annuluses 31, 32 and 33 are formed similar to annuluses 11, 12 and 13, and also a spacer 34 is provided like spacer 14. However the dimensions are such that the outer and inner edges of the assembly are retained in the spun or pressed sheet metal rings 36 and 37. These rings are formed U-shaped in transverse cross-section, and ring 36 has a sealed engagement with the outer edge of annulus 31. If desired sealing gaskets 38 can be employed. Ring 37 clamps the inner edges of the annuluses 32 and 33 together upon the spacing element 34. Mounting ring 36 is made to a diameter slightly larger than the diameter of the bore 17 in which the same is to be placed, whereby when pressed into the position desired a sealing engagement is established to the housing 18. Ring 37 is similarly formed to a diameter slightly smaller than the diameter of shaft 16, whereby the same can likewise be pressed upon the shaft to establish sealing engagement. It will be evident that by use of a suitable tool the complete assembly in a single operation can be pressed into proper position with respect to the shaft and outer part, or with respect to a ball bearing assembly as shown in Figure 6. Operation of this assembly is the same as that previously described with reference to Figures 1 to 4 inclusive.

Figure 8:
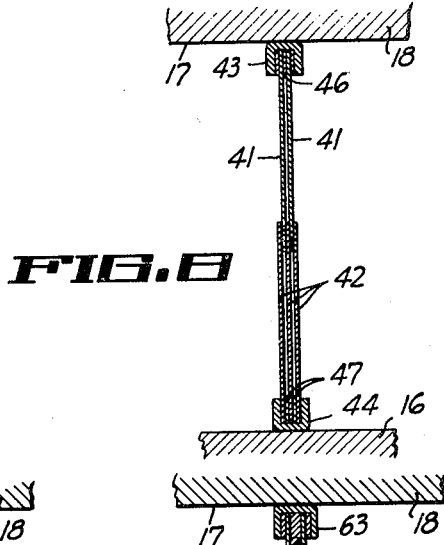
Figure 8 is an enlarged sectional detail serving to illustrate another embodiment of the invention.

In some instances it is desirable to provide additional interface sealing contacts. As shown in Figure 8 this is accomplished by utilizing two annuluses 41 disposed side by side, in conjunction with three smaller annuluses 42. All of these annuluses are formed of relatively thin flexible sheet metal the same as Figures 1 to 4 inclusive. The outer edges of annuluses 41 are clamped together by the mounting ring 43, which in turn is pressed within the bore 17. The annuluses 42 are similarly retained by the inner clamping ring 44, which is pressed upon the shaft 16. The spacers 46 and 47 are dimensioned whereby the proper preloading is provided between the annular areas in interface sealing contact. For example spacer 46 can be of a thickness slightly less than the thickness of the annuluses 42. Spacers 47 can be of a thickness slightly less than the thickness of the annuluses 41. Here again sufficient lubrication is provided whereby a lubricating film is interposed between the areas in interface sealing contact to reduce friction to a minimum. An arrangement of this character is capable of withstanding considerable differential pressure, particularly in comparison with the arrangement of Figures 1 to 4 inclusive, where only two interface contacting areas are provided.

Figure 9:
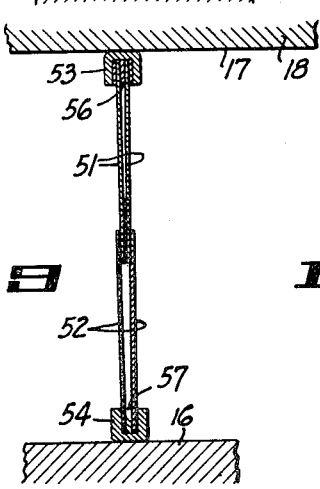
Figure 9 is an enlarged cross-sectional detail illustrating another embodiment of the invention.

Figure 9 illustrates another form in which two side by side annuluses 51 are used in conjunction with two side by side smaller annuluses 52. Here again the annuluses are formed of relatively flexible thin sheet metal the same as Figures 1 to 4 inclusive. The larger annuluses 51 are retained by the mounting ring 53, and the annuluses 52 by ring 54. The spacers 56 and 57 are dimensioned to provide proper loading between the overlapping areas, to provide the desire interface seal. An arrangement of this character operates in the same manner as Figures 1 to 4 inclusive, but because of the fact that annuluses 51 are spaced apart the arrangement permits a somewhat greater amount of longitudinal movement of the shaft relative to the housing 18, without causing a separation of the areas in interface contact and without consequent loss of the desired seal.

Figure 10:
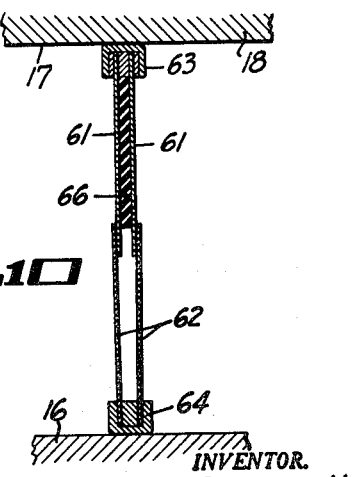
Figure 10 is an enlarged cross-sectional detail illustrating another embodiment of the invention.

In the form of the invention shown in Figure 10 the annuluses 61 cooperate with annuluses 62, and are carried by mounting rings 63 and 64, substantially as in Figure 9. However supplemental resilient means is provided to augment the stress of the annuluses to provide a desired loading between the overlapping annular areas. The supplemental means in this instance is an annulus 66 which can be formed of suitable resilient material such as synthetic rubber. If desired this element can be of a material like neoprene, capable of slight swelling upon contact with oil. Such swelling action tends to increase the loading between the overlapping annular areas. In place of a material like neoprene a spongy synthetic rubber can be provided which can be saturated with lubricating oil. Element 66 will last indefinitely because it is stressed in compression rather than tension.

Figure 11:
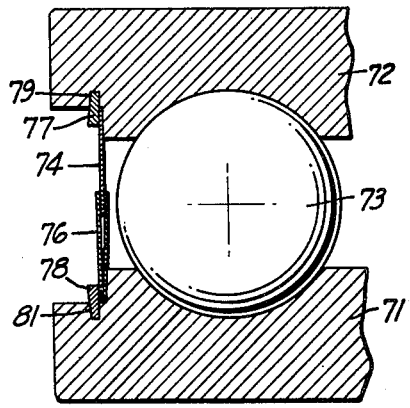
Figure 11 is a cross-sectional detail illustrating another embodiment of the invention in which my sealing assembly is incorporated with a ball bearing assembly.

In place of forming an assembly for application to a shaft and associated housing, it is possible to form a sealing assembly incorporating the present invention in conjunction with a ball or roller bearing assembly. Thus in Figure 11 a ball bearing assembly is shown consisting of the inner and outer race rings 71 and 72, together with the balls 73. Mounted upon one side of the bearing races, and upon the other side likewise if desired, there is a sealing assembly consisting of annuluses 74 and 76, assembled substantially in the same manner as described with reference to Figures 1 to 4 inclusive. As a simple means for retaining this assembly in place, I have shown outer and inner snap rings 77 and 78, which engage within the machined recesses 79 and 81, and which are preferably tapered to provide effective clamping forces such as are required to provide sealing engagement with the annuluses.

Figure 12:
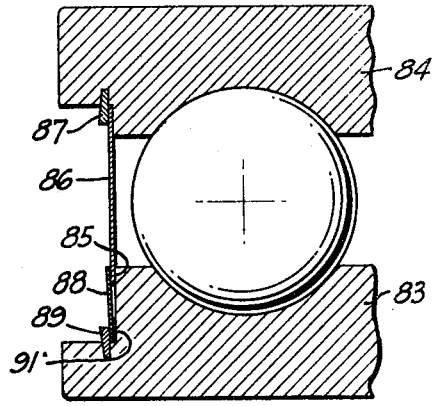
Figure 12 is a cross-sectional detail showing another embodiment of the invention likewise incorporated in a ball bearing assembly.

While in general it is desirable that my sealing assembly provide its own annular areas in sealing interface contact, it is possible as shown in Figure 12 to make use of a ground annular surface formed upon a bearing part, such as the inner race ring 71. Thus in this instance race rings 83 and 84 are similar to the rings 71 and 72 of Figure 11, but ring 83 is machined and ground to provide a smooth annular area 85 in a plane at right angles to the axis of the bearing. A thin sheet metal annulus 86 has its outer peripheral edge carried by the ring 84, and retained by the tapered snap ring 87. The inner margin of annulus 86 overlaps the race area 85, and also overlaps a second flexible thin metal annulus 88. Annulus 88 has its inner peripheral edge retained upon the ring 83 by the tapered snap ring 89. A spacer 91 may be inserted between annulus 88 and the adjacent shoulder of the race 83, and this spacer is dimensioned whereby annulus 88 is normally stressed to provide proper loading to press together the overlapping areas between annulus 88 and annulus 86, and also between annulus 86 and the surface 85 of race 83. Here again the areas in interface sealing contact are lubricated by a thin oil film whereby relative sliding movement occurs with a minimum of friction, and whereupon an effective fluid seal is insured at all times.

Figure 13:
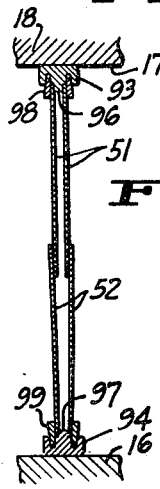
Figure 13 is an enlarged cross-sectional detail illustrating another embodiment of the invention somewhat similar to the form illustrated in Figure 9, but with special machined mounting rings used in place of spun sheet metal.

Figure 13 illustrates a form of the invention similar to that shown in Figure 9, but with a modified form of clamping rings. Thus in this instance in place of utilizing rings formed of spun or pressed sheet metal, I provide machined rings 93 and 94. The construction of these rings is such as to form annular spacing ribs 96 and 97, which serve to properly space annuluses 51 and 52, and also to provide annular recesses to receive the tapered snap clamping rings 98 and 99. Mounting rings 93 and 94 are dimensioned to form pressed sealed fits with the bore 17 and the outer surface of shaft 16, the same as the clamping rings described with reference to Figure 7. It is possible to form ribs 96 and 97 as separable spacers, thus simplifying machining of the rings 93, 94.

Figure 14:
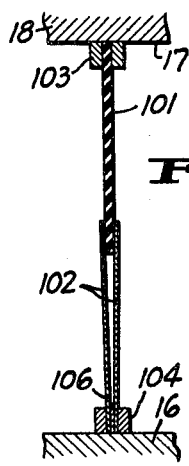
Figure 14 is an enlarged cross-sectional detail illustrating another embodiment of the invention in which one of the annuluses is made of non-metallic material.

Although it is deemed preferable to form all of the annuluses of relatively thin flexible spring metal, it is possible to use in part non-metallic material such as Bakelite or like molded plastic, or a suitable grade of rubber-like material. Thus as shown in Figure 14 the seal assembly makes use of an annulus 101 formed of non-metallic material, such as relatively thin sheet Bakelite, in conjunction with two annuluses 102 formed of relatively thin flexible sheet metal. The outer annulus 101 is retained by the clamping rings 103, and the metal annuluses 102 are likewise retained by clamping rings 104, in conjunction with the intervening spacer 106.

Figure 15:
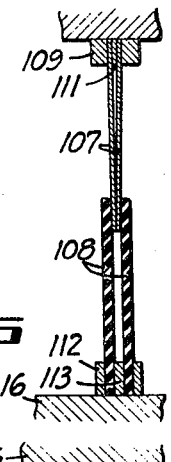
Figure 15 is an enlarged cross-sectional detail illustrating another embodiment of the invention in which two annuluses are made of non-metallic material.

Figure 15 likewise shows an arrangement in which both metallic and non-metallic annuluses are employed. In this instance the annuluses 107 are formed of relatively thin sheet metal, and the inner two annuluses 108 are formed of non-metallic material, such as relatively thin sheet Bakelite. Annuluses 107 are retained by the clamping rings 109, in conjunction with spacer 111. Annuluses 108 are retained by clamping rings 112 in conjunction with the spacer 113. The manner in which these parts cooperate to form a seal is similar to that illustrated in Figure 9.

Figure 15a illustrates an embodiment somewhat like Figure 15 but with additional thin metal annuluses supplementing the annuluses. Thus in this instance thin metal annuluses 108a are disposed adjacent the outer faces of the non-metallic elements 108, and they are stressed to provide all or a substantial amount of the loading between the interface sealing areas. This makes possible partial or complete elimination of stressing for elements 108.

Figure 16:
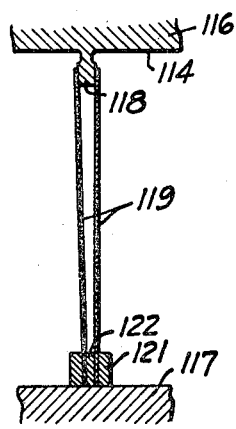
Figure 16 is an enlarged cross-sectional detail showing another embodiment of the invention in which one annulus is made integral with one part of the bearing.

While it is desirable and preferable in most instances for the annuluses to be capable of flexibility in a direction longitudinally of the shaft, it is possible in some instances to utilize a relatively rigid annulus or rib, or some equivalent member fixed with respect to one of the bearing parts with which the seal is being made. Thus as shown in Figure 16 the bore 114 of the housing 116, through which the shaft 117 extends, is provided with an integral annular rib 118 having machined or ground annular areas upon its opposite faces. Thin flexible sheet metal annuluses 119 have their outer margins overlapping and pressed in sealing interface contact with rib 118, and these annuluses are retained upon shaft 117 by clamping rings 121, in conjunction with spacer 122. While an arrangement of this character will form an effective fluid-tight seal, it will be evident that the shaft in this instance cannot have an amount of permissible longitudinal movement as great as with assemblies such as shown in Figures 1 to 10, 13 to 15, inclusive, because of the rigid character of the rib 118. Furthermore in this instance the parts cannot be manufactured as a preloaded assembly, carrying areas urged in interface sealing contact.

Figure 17:
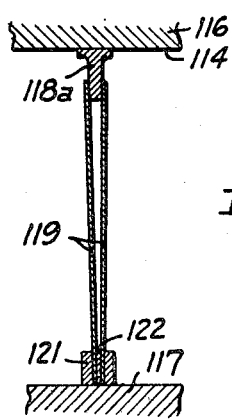
Figure 17 is an enlarged cross-sectional detail showing another embodiment in which one annulus of the assembly is made of rigid material and cooperates with a plurality of flexible annuluses.

Figure 17 shows an arrangement somewhat similar to Figure 16, but in this instance in place of a rib 118 integral with the housing 116, a ring 118a is provided made of suitable material such as metal, Bakelite or the like. This ring is formed to provide suitable annular areas for interface sealing contact with the outer margins of the metal annuluses 119, and has a suitable pressed fit within the bore 114.

Figure 18:
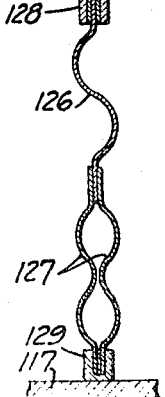
Figure 18 is an enlarged cross-sectional detail illustrating an assembly in which corrugated annuluses are employed.

In all of the foregoing embodiments the sealing annuluses are flat or planar. It is possible however to depart from planar construction, particularly in order to increase the flexing action afforded, and thus either enabling use of lighter gauge metal, or accommodating a greater amount of relative longitudinal movement of the shaft. Thus in Figure 18 the outer and inner annuluses 126 and 127 are formed of relatively thin flexible sheet metal, but they are provided with corrugations. The corrugations extend concentrically about the axis of the shaft with which the assembly is used. The mounting rings 128, 129 for the annuluses 126, 127 can be similar to the rings 36 and 37 illustrated and described with reference to Figure 7.

It will be evident that the invention can be embodied in forms other than the embodiments described above. It can be applied to a wide variety of services, including for example the provision of a seal to prevent escape of various gases, liquids or vapors, as well as oil or grease lubricants. Also it can be used at elevated temperatures within the limits of the lubricant available. While the areas of the sheet metal parts in interface sealing contact will ordinarily not require any machining or grinding, it is possible to apply what is known as a micro-finish to the areas in contact, where it is desired to increase the ability of the seal to withstand fluid pressures.

Previous reference has been made to use of thin metal having a thickness of 0.003 inch for the annuluses. By way of example rather than by limitation it can be explained that in practice where the assembly is formed as illustrated in Figures 1 to 4 inclusive a metal thickness has been used for the annuluses ranging from 0.002 to 0.006 depending upon the diameter of the shaft and the diameter of the bore 17. The thinner gauges of say 0.002 to 0.004 inch are suitable for the smaller sized bearings, as for example where the shafts measure 0.5 to 2.0 inches in diameter and the bore 17 1.5 to 3.25 inches in diameter. The thicker gauges can be used for the larger sized bearings such as for example where the shafts measure 3.0 to 4.5 inches in diameter and the bore 17 4 to 6 inches. For simple bearing seals the annuluses can be dimensioned so that the overlap occurs substantially midway between the shaft and the wall of the bore 17. It will be evident however that the relative proportioning of the annuluses can be varied in practice to suit different conditions. Likewise the area presented by the annuluses can be adjusted to suit varying conditions, as for example to provide a minimum of free exposed area where substantial differential pressures are to be withheld.

To summarize important features of the invention, in the preferred forms described above an assembly is provided which incorporates its own interface sealing areas and which is preloaded with respect to the forces urging the areas into sealing contact. Installation is simple and very little space is occupied in the final installation. Thus use of my assembly facilitates design of the equipment with which the assembly is to be used. Installation of my invention enables operation at even relatively high rotative speeds without pumping action and without appreciable wear or friction. The seal is maintained irrespective of slight misalignments of the shaft with respect to the bore or bearing in which it is operating. Barring mutilation by accident or misuse, my seal will last indefinitely without replacement or servicing.

I claim:

1. A sealing device for establishing a fluid-tight seal between relatively rotatable inner and outer parts having an annular space therebetween for receiving said sealing device, said sealing device comprising, an outer sealing structure adapted to be carried by said outer part in fluid-tight relation therewith and extend radially inward into said space, an inner sealing structure adapted to be carried by said inner part in fluid-tight relation therewith and extend radially outward into space, said inner structure having an annular portion adapted to be fixed to said inner part and fixedly carrying two outwardly extending annular sealing elements overlapping and receiving said outer structure therebetween, said outer structure having at least one inwardly extending annular sealing element providing annular substantially radial sealing areas contacting corresponding sealing areas on said elements of said inner structure, said corresponding sealing areas on the elements of said inner structure being annular and substantially parallel to the sealing areas of said outer structure, at least two of said elements being of thin spring metal and being axially stressed within their elastic limits to resiliently urge said sealing areas into sealing engagement, one end of said sealing device at said sealing areas being constituted by one of the elements of said inner structure.

2. A sealing device for establishing a fluid-tight seal between relatively rotatable inner and outer parts having an annular space therebetween for receiving said sealing device, said sealing device comprising, an outer sealing structure adapted to be carried by said outer part in fluid-tight relation therewith and extend radially inward into said space, an inner sealing structure adapted to be carried by said inner part in fluid-tight relation therewith and extend radially outward into said space, said inner structure having an annular portion adapted to be fixed to said inner part, two outwardly extending annular sealing elements having their inner peripheries clamped in said annular portion and their outer peripheries overlapping and receiving said outer structure therebetween, said outer structure having at least one inwardly extending annular sealing element providing annular substantially radial sealing areas contacting corresponding sealing areas on said elements of said inner structure, said corresponding sealing areas on the elements of said inner structure being annular and substantially parallel to the sealing areas of said outer structure, said elements of said inner structure being of thin spring metal and being axially spaced in said annular portion a distance less than the axial width of the inner periphery of said outer structure so as to be axially stressed within their elastic limits to resiliently urge said sealing areas into sealing engagement, one end of said sealing device at said sealing areas being constituted by one of the elements of said inner structure.

3. A sealing device for establishing a fluid-tight seal between relatively rotatable inner and outer parts having an annular space therebetween for receiving said sealing device, said sealing device comprising, an outer sealing structure adapted to be carried by said outer part in fluid-tight relation therewith and having an annular sealing element extending radially inward into said space, an inner sealing structure adapted to be carried by said inner part in fluid-tight relation therewith and extend radially outward into said space, said inner structure having an annular portion adapted to be fixed to said inner part, two outwardly extending annular sealing elements having their inner peripheries clamped in said annular portion and their outer peripheries overlapping and receiving said element of said outer structure therebetween, said sealing element of said outer structure providing annular substantially radial sealing areas contacting corresponding sealing areas on said elements of said inner structure, said corresponding sealing areas on the elements of said inner structure being annular and susbtantially parallel to the sealing areas of said outer structure, said elements of said inner structure being of thin spring metal and being axially spaced in said annular portion a distance less than the axial thickness of said element of said outer structure so as to be axially stressed within their elastic limits to resiliently urge said sealing areas into sealing engagement, one end of said sealing device at said sealing areas being constituted by one of the elements of said inner structure.

4. A sealing device for establishing a fluid-tight seal between relatively rotatable inner and outer parts having an annular space therebetween for receiving said sealing device, said sealing device comprising, an outer sealing structure adapted to be carried by said outer part in fluid-tight relation therewith and extend radially inward into said space, an inner sealing structure adapted to be carried by said inner part in fluid-tight relation therewith and extend radially outward into said space, said inner structure having an annular portion adapted to be fixed to said inner part, two outwardly extending annular sealing elements having their inner peripheries clamped in said annular portion and their outer peripheries overlapping and receiving said outer structure therebetween, said outer structure having two inwardly extending annular sealing elements providing annular substantially radial sealing areas contacting corresponding sealing areas on said elements of said inner structure, said corresponding sealing areas on the elements of said inner structure being annular and substantially parallel to the sealing areas of said outer structure, at least two of said elements being of thin spring metal and being axially stressed within their elastic limits to resiliently urge said sealing areas into sealing engagement, the last-mentioned two elements being part of one of said structures, one end of said sealing device at said sealing areas being constituted by one of the elements of said inner structure.

5. A sealing device for establishing a fluid-tight seal between relatively rotatable inner and outer parts having an annular space therebetween for receiving said sealing device, said sealing device comprising, an outer sealing structure adapted to be carried by said outer part in fluid-tight relation therewith and extend radially inward into said space, an inner sealing structure adapted to be carried by said inner part in fluid-tight relation therewith and extend radially outward into said space, said inner structure having an annular portion adapted to be fixed to said inner part, two outwardly extending annular sealing elements having their inner peripheries clamped in said annular portion and their outer peripheries overlapping and receiving said outer structure therebetween, said outer structure having two inwardly extending annular sealing elements providing annular substantially radial sealing areas at their inner peripheries contacting corresponding sealing areas on said elements of said inner structure, said corresponding sealing areas on the elements of said inner structure being on the outer peripheries thereof and being annular and substantially parallel to the sealing areas of said outer structure, said elements being of thin spring metal and being axially stressed within their elastic limits to resiliently urge said sealing areas into sealing engagement, the ends of said sealing device at said sealing areas being constituted by said elements of said inner structure.

6. A sealing device for establishing a fluid-tight seal between relatively rotatable inner and outer parts having an annular space therebetween for receiving said sealing device, said sealing device comprising, an outer sealing structure adapted to be carried by said outer part in fluid-tight relation therewith and extend radially inward into said space, an inner sealing structure adapted to be carried by said inner part in fluid-tight relation therewith and extend radially outward into said space, said inner structure having an annular portion adapted to be fixed to said inner part, two outwardly extending annular sealing elements having their inner perpheries clamped in said annular portion and their outer peripheries overlapping and receiving said outer structure therebetween, said outer structure having an annular portion adapted to be fixed to said outer part, at least one inwardly extending annular sealing element having its outer periphery clamped in said annular portion of said outer structure and its inner periphery providing annular substantially radial sealing areas contacting corresponding sealing areas on said elements of said inner structure, said corresponding sealing areas on the elements of said inner structure being annular and substantially parallel to the sealing areas of said outer structure, said elements of said inner structure being of thin spring metal and being axially spaced in said annular portion of said inner structure a distance less than the axial thickness of the inner periphery of said outer structure so as to be axially stressed within their elastic limits to resiliently urge said sealing areas into sealing engagement, one end of said sealing device at said sealing areas being constituted by one of the elements of said inner structure.

7. A sealing device for establishing a fluid-tight seal between relatively rotatable inner and outer parts having an annular space therebetween for receiving said sealing device, said sealing device comprising, an outer sealing structure adapted to be carried by said outer part in fluid-tight relation therewith and extend radially inward into said space, an inner sealing structure adapted to be carried by said inner part in fluid-tight relation therewith and extend radially outward into said space, said inner structure having an annular portion adapted to be fixed to said inner part, two outwardly extending annular sealing elements having their inner peripheries clamped in said annular portion and their outer peripheries overlapping and receiving said outer structure therebetween, said outer structure having an annular portion adapted to be fixed to said outer part, two inwardly extending annular sealing elements having their outer peripheries clamped in said annular portion of said outer structure and their inner peripheries providing annular substantially radial sealing areas contacting corresponding sealing areas on the outer peripheries of said elements of said inner structure, said corresponding sealing areas on the elements of said inner structure being annular and substantially parallel to the sealing areas of said outer structure, said elements of said inner structure being of thin spring metal and being axially spaced in said annular portion of said inner structure a distance less than the axial thickness of the inner periphery of said outer structure so as to be axially stressed within their elastic limits to resiliently urge said sealing areas into sealing engagement, the ends of said sealing device at said sealing areas being constituted by said elements of said inner structure.

8. A sealing device for establishing a fluid-tight seal between relatively rotatable inner and outer parts having an annular space therebetween for receiving said sealing device, said sealing device comprising, an outer sealing structure adapted to be carried by said outer part in fluid-tight relation therewith and extend radially inward into said space, an inner sealing structure adapted to be carried by said inner part in fluid-tight relation therewith and extend radially outward into said space, said inner structure having an annular portion adapted to be fixed to said inner part, two axially spaced outwardly extending annular sealing elements having their inner peripheries clamped in said annular portion and their outer peripheries providing annular substantially radial sealing areas, said outer structure having an annular portion adapted to be fixed to said outer part, two inwardly extending annular sealing elements having their outer peripheries clamped in said annular portion of said outer structure and their inner peripheries overlapping said elements of said inner structure and providing annular substantially radial sealing areas contacting said sealing areas on said elements of said inner structure, said sealing areas on the elements of said inner structure being substantially parallel to the sealing areas of said outer structure, said elements of said structures being of thin spring metal and being axially spaced in said annular portions of said structures so as to be axially stressed within their elastic limits to resiliently urge said sealing areas into sealing engagement, the elements of one of said structures being positioned between the elements of the other of said structures at said sealing areas.

LAWRENCE G. SAYWELL.

REFERENCES CITED

The following references are of record in the file of this patent:

UNITED STATES PATENTS

| Number | Name | Date |
|---|---|---|
| 2,151,730 | Bosebe et al. | Mar. 28, 1939 |
| 2,151,444 | Searles | Mar. 28, 1939 |
| 2,189,838 | Shafer | Feb. 13, 1940 |
| 1,891,706 | De Ram | Dec. 20, 1932 |

FOREIGN PATENTS

| Number | Country | Date |
|---|---|---|
| 355,439 | Great Britain | 1931 |

Certificate of Correction

Patent No. 2,428,041. September 30, 1947.

LAWRENCE G. SAYWELL

It is hereby certified that errors appear in the printed specification of the above numbered patent requiring correction as follows:

Column 12, list of references cited, under "United States Patents" add the following:

| | | |
|---|---|---|
| 1,400,119 | Whittingham | Dec. 13, 1921 |
| 1,560,669 | Dennedy | Nov. 10, 1925 |
| 2,047,764 | Beggs | July 14, 1936 |
| 2,245,475 | Hately | June 10, 1941 |
| 2,385,388 | Thoresen | Sept. 25, 1945 | and under "Foreign Patents" add the following:

| | | |
|---|---|---|
| 19,968 | Great Britain | 1909 | and that the said Letters Patent should be read with these corrections therein that the same may conform to the record of the case in the Patent Office.

Signed and sealed this 22nd day of November, A. D. 1949.

[SEAL]

THOMAS F. MURPHY,
*Assistant Commissioner of Patents.*